United States Patent
Klappenbach et al.

(10) Patent No.: US 6,201,326 B1
(45) Date of Patent: Mar. 13, 2001

(54) DRIVE DEVICE FOR MOVING A SLIDING SUNROOF OF A VEHICLE

(75) Inventors: Christoph Klappenbach; Klaus Spinner, both of Buehl; Robert Heitz, Buehlertal; Alois Hils, Sasbach; Christian Baeuerle, Bühl, all of (DE); Friedrich-Wilhelm Dreier, São Paulo (BR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,789

(22) PCT Filed: Dec. 11, 1998

(86) PCT No.: PCT/DE98/03637

§ 371 Date: Dec. 14, 1999

§ 102(e) Date: Dec. 14, 1999

(87) PCT Pub. No.: WO99/41824

PCT Pub. Date: Aug. 19, 1999

(30) Foreign Application Priority Data

Feb. 10, 1998 (DE) .............................................. 198 05 185

(51) Int. Cl.[7] ........................................................ H02K 7/10
(52) U.S. Cl. ........................ 310/75 R; 310/67 R; 310/71; 310/239
(58) Field of Search ................................ 310/75 R, 67 R, 310/51, 71, 239, 249, 251, 89

(56) References Cited

U.S. PATENT DOCUMENTS

| 5,528,093 | * | 6/1996 | Adam et al. | 310/89 |
| 5,872,411 | * | 2/1999 | Nakata | 310/71 |
| 5,942,819 | * | 8/1999 | Burgess et al. | 310/51 |

* cited by examiner

Primary Examiner—Nestor Ramirez
Assistant Examiner—Thanh Lam
(74) Attorney, Agent, or Firm—Ronald E. Greigg; Edwin E. Greigg

(57) ABSTRACT

A brush holder equipped as a component on a printed circuit board and is inserted into a recess provided in a transmission housing of the drive device and thereby can be slid in the radial direction over a commutator of an already completely assembled armature. The drive device according to the invention is provided for moving a sliding sunroof of a vehicle.

12 Claims, 5 Drawing Sheets

DRIVE DEVICE FOR MOVING A SLIDING SUNROOF OF A VEHICLE

PRIOR ART

The invention is based on a drive device, in particular for moving a sliding sunroof of a vehicle. A drive device has already been disclosed (European Patent Document 0 474 904), which is used to drive a window lifter. The drive device has a base housing, which is injection molded in one piece and is comprised of a transmission housing and an electronics housing. An electric motor which has an armature is affixed to the housing. The armature is accommodated in a cup-shaped pole housing, whose open end face is screw connected to the base housing. The armature also has a commutator which is disposed outside the pole housing in the base housing. An end region of the armature, which region adjoins the commutator, is thereby embodied in the form of a transmission drive shaft for a transmission and in this connection, has the form of a worm shaft, for example. In addition, a printed circuit board is accommodated in the base housing, which has a narrow strut that protrudes laterally from the printed circuit board. A brush holder that supports a brush is affixed to the strut.

Furthermore, the printed circuit board has a connecting piece that is embodied as a plug receptacle. The assembly of the drive device takes place in such a way that first, the printed circuit board is introduced into the transmission housing or base housing and is fastened there. Then, the assembly of the armature that is accommodated in the pole housing takes place, for which it is necessary to thread the armature with its commutator into the brush holder between the brushes. A final fixing of the position of the brush holder takes place after the fastening of the pole housing and only after a precise adjustment of the brush holder, to which end the brush holder is secured tightly to the printed circuit board by means of screws. An exact positioning of the brush holder or of the brushes resting against the commutator is necessary since otherwise, a faultless operation of the drive device cannot be assured. The assembly method described not only requires some skill, but it also hinders a machine assembly of the drive device. Moreover, since the brush holder is affixed only to a narrow strut of the printed circuit board, the result is a low mechanical stability and a complex and therefore expensive manufacturing process of the printed circuit board.

ADVANTAGES OF THE INVENTION

The drive device according to the invention has the advantage over the prior art of a simplified assembly as well as a particularly space-optimized embodiment and disposition of the printed circuit board in the drive device. It is particularly advantageous that an adjustment of the brush holder can be eliminated in the process. Furthermore, a simple disassembly of the brush holder with the brushes is also possible.

Advantageous improvements and updates of the drive device are possible by means of the measures taken hereinafter.

It is also advantageous that the brush holder and a plug receptacle that is provided can be embodied in one piece as a joint component, but can also be embodied as two separate pieces in order to thus be able to flexibly fulfill a wide variety of requirements in regard to the position and embodiment of the plug receptacle in a mass production process. Another advantage is a simplified assembly which is produced by virtue of the fact that during the final assembly of the armature, the brushes remain in a rear position in order to deliberately disengage only after the final assembly, for example of a transmission cover. It is also particularly advantageous that so-called Hall sensors, which in connection with a magnet ring disposed on the armature can detect the speed of the drive device, can be placed on the printed circuit board in a particularly advantageous manner. It is also advantageous that required interference suppression elements can be integrated directly into the brush holder, which increases the efficiency of the interference suppression measures as a result of the spatial proximity to the brushes. It is particularly advantageous that interference suppression coils that are integrated into the brush holder can simultaneously produce an electrical contact of the brushes with the electrical components provided on the printed circuit board. It is also advantageous that due to the rectangular shape of the printed circuit board, a necessary amount of waste in the production of the printed circuit boards can be reduced, by means of which the manufacturing costs of the printed circuit board can be reduced.

BRIEF DESCRIPTION OF THE DRAWINGS

Exemplary embodiments of the invention are shown in a simplified fashion in the drawings and will be explained in detail in the subsequent description.

DESCRIPTION OF THE EXEMPLARY EMBODIMENTS

Figure 1:
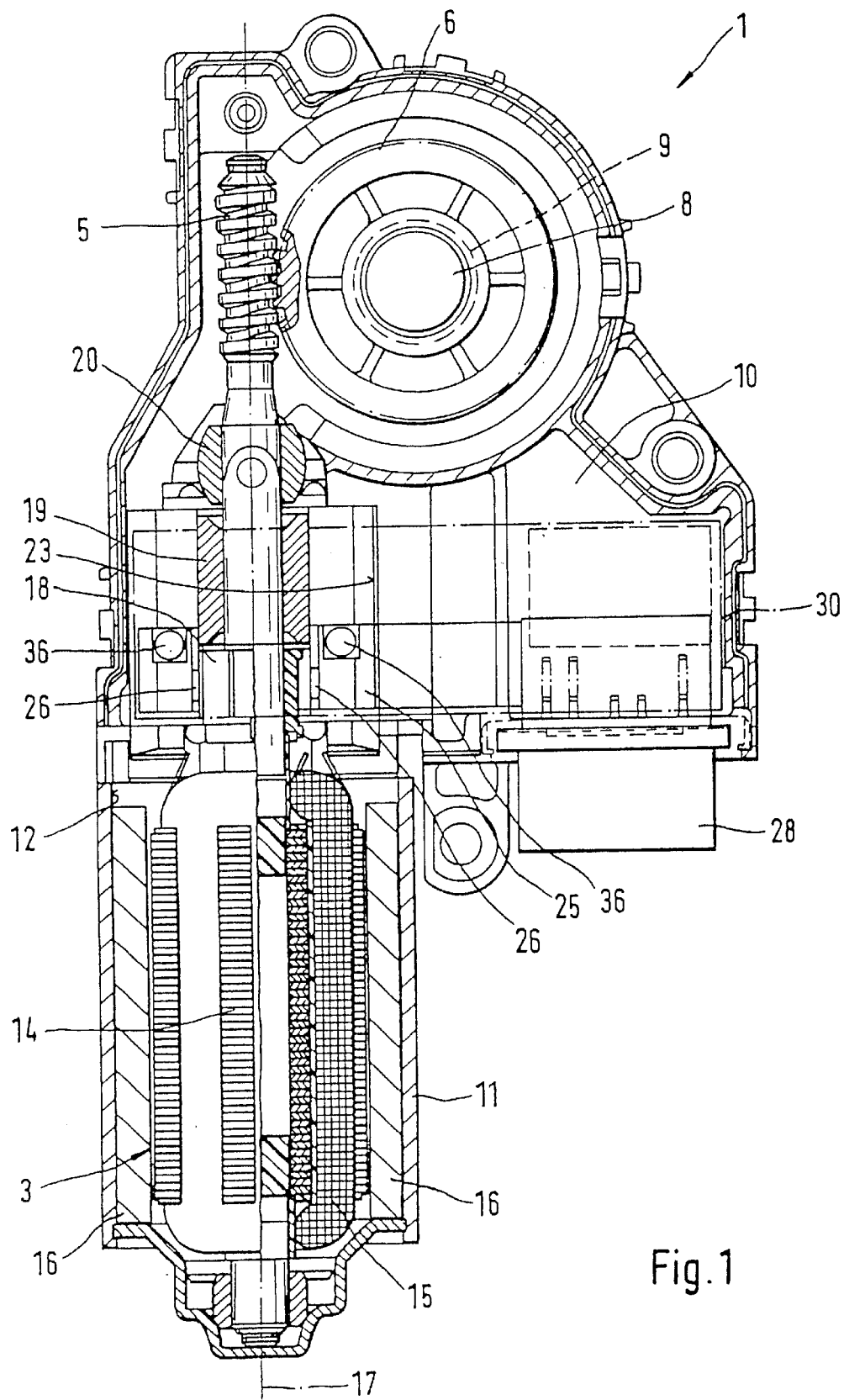
FIG. 1 is a top view of a partially sectional representation of a drive device in accordance with a first exemplary embodiment according to the invention.

FIG. 1 shows a partially sectional representation of a drive device 1, which is particularly suited for moving a sliding sunroof of a vehicle, in particular a motor vehicle. For this purpose, the drive device 1 has an electric motor 3 with a step-down transmission which is comprised for example of a worm shaft 5 and a worm gear 6 that meshes with the worm shaft 5. The worm gear 6 is connected in a rotationally fixed manner to a drive pinion 9, which is affixed to a shaft 8 and is drawn with dashed lines in FIG. 1, which for its part, by way of a mechanism that is not shown in detail, can open or close a sliding sunroof of the vehicle, also not shown in detail. By way of a decoupling mechanism, which is comprised for example of a driving pin that is not shown in detail and can be correspondingly actuated by a tool, it is possible to interrupt the rotationally fixed connection of the worm gear 6 to the drive pinion 9. The step-down transmission 5, 6 is accommodated in a transmission housing 10, which is embodied for example as a cast metal part. The transmission housing 10 is flange-mounted to a cup-shaped pole housing 11 of the electric motor 3. An armature 14 is accommodated so that it can rotate in the pole housing 11 and, in a known fashion, has coils 15 which cooperate with permanent magnets 16 that are accommodated on an inside wall 12 on the interior of the pole housing 11 in order to produce a rotation of the armature 14 when the coils 15 are supplied with current. For the current supply of its coils 15, the armature 14 has a commutator 18 of a known type on its part disposed outside the pole housing 11 in the transmission housing 10 and this commutator 18 cooperates for example with two brushes 26, in particular carbon brushes. The commutator 18 is adjoined by a magnet ring 19 in the direction of the worm gear 6. Further in the direction toward the worm gear 6, the magnet ring 19 is adjoined by a bearing 20 for the armature 14, that extends from an end region of the armature 14 and is embodied in the form of a transmission drive shaft, for example as a worm shaft 5.

Approximately centrally divided by the commutator 18 and the magnet ring 19, a recess 23 is provided in the transmission housing 10, which has for example a rectangular cross section. The recess 23 extends in the axial direction along an armature shaft 17 of the armature 14 approximately in the vicinity of the commutator 18 and magnet ring 19. A brush holder 25, which holds the at least two brushes 26 against the commutator 18, engages in the recess 23. The brush holder 25 has an essentially block-shaped form and extends in the axial direction at least beyond the commutator 18. According to a first exemplary embodiment, the brush holder 25 assumes virtually the entire width of the transmission housing 10 lateral to the armature shaft 17 and transitions in one piece into a contacting section, which is embodied for example in the form of a plug receptacle 28. The brush holder 25, which is embodied as one component with the plug receptacle 28, has an L-shape on the whole. The plug receptacle 28, which protrudes slightly from the transmission housing 10, is used to connect an electric plug, which is not shown in detail, the electric plug contacts the plug receptacle 28 in order to supply current to the drive device 1. The brush holder 25 is affixed to a printed circuit board 30, which is only indicated with dot-and-dash lines in FIG. 1, which has a rectangular outline like the brush holder 25. The printed circuit board 30 extends essentially with the same width as the brush holder 25, with its greatest expanse lateral to the armature shaft 17 of the armature, and is wider in the axial direction than the brush holder 25 so that at least the commutator 18 and for example also the magnet ring 19 are covered.

Figure 2:
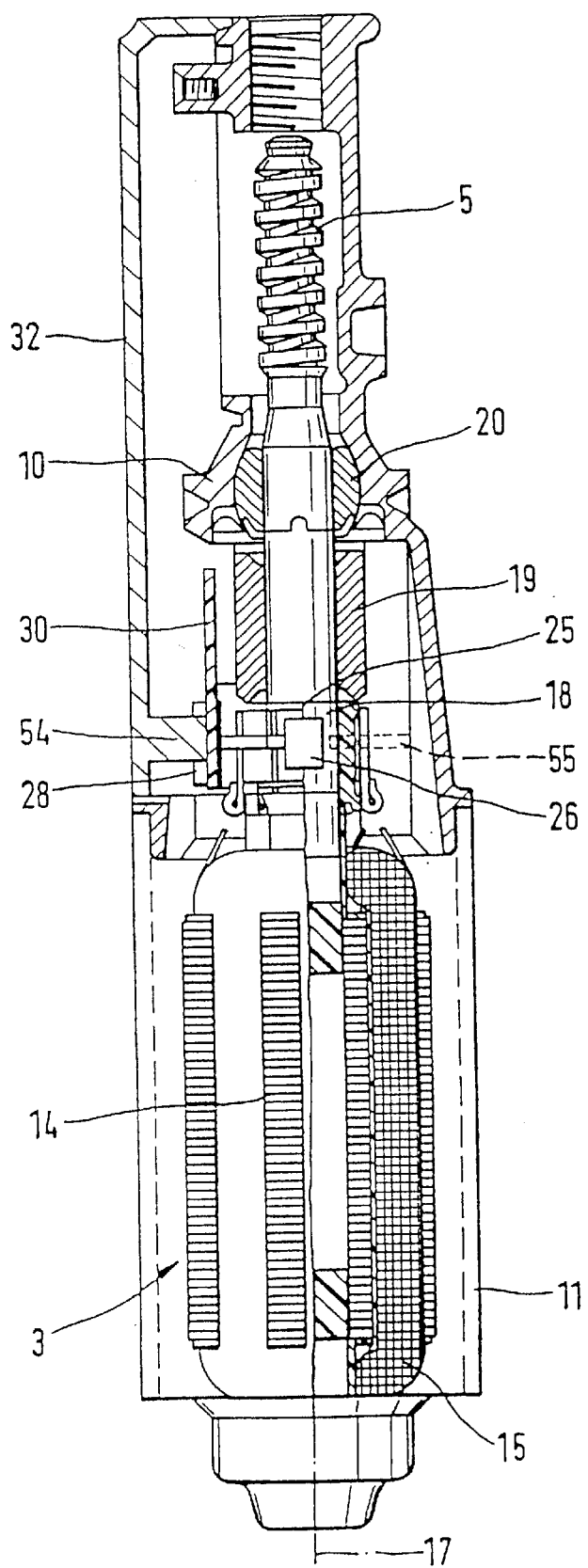
FIG. 2 is a side view of a partial sectional representation of the drive device according to FIG. 1.

As shown in detail in FIG. 2, a partial sectional representation of a side view of the drive device 1, according to FIG. 1, the brush holder 25 with its two brushes 26 engages the commutator 18 in a vise fashion. The brush holder 25 is also used to secure the printed circuit board 30, which extends spaced radially apart from the commutator 18. The transmission housing 10 can be closed by a transmission housing cover 32, which extends for example to the pole housing 11. The brush holder 25 and the plug receptacle 28 are embodied for example in the form of a one-piece component, which can be produced, for example, with the plastic injection molding technique. Naturally, the brush holder 25 and the plug receptacle 28 can also be disposed separately as individual components on the printed circuit board 30, as shown in FIG. 3, a top view of the printed circuit board 30 in a schematically simplified representation of a second exemplary embodiment according to the invention.

The printed circuit board 30 also includes other components, for example a varistor which is provided for stabilizing the voltage and to this end, has an electric resistance whose conductance increases with rising voltage. Furthermore, a capacitor is also provided, which is affixed to the printed circuit board 30 for example jointly with the varistor as a so-called combined element 35. In addition, still other elements are provided, such as two interference suppression chokes 36, which are preferably accommodated in the plastic of the brush holder 25, in sleeve-shaped recesses 27 FIG. 4 in the brush holder 25. It is also conceivable to fasten the interference suppression chokes 36 separately on the printed circuit board 30. Other interference suppression elements can also be accommodated on the printed circuit board 30 in the form of so-called SMD components (surface mounted devices) so that it is not necessary to manually equip the component holder 25 with the interference suppression chokes 36. Furthermore, at least one Hall sensor 37 is provided, which is accommodated for example inside a rectangular recess 29 of the brush holder 25 between the interference suppression chokes 36 on the printed circuit board 30. Preferably, two Hall sensors 37 are provided, which after the final assembly of the printed circuit board 30, are disposed in the immediate vicinity of the magnet ring 19. Distributed over its circumference, the magnet ring 19 has at least one permanently magnetized region, in order to be able to use the at least one Hall sensor 37 to detect the actual position of the armature 14 or to detect its speed. Furthermore, the printed circuit board 30 can also have other electrical or electronic components 38, which are used for example to control the drive device 1 and to evaluate the electrical signals emitted by the Hall sensors 37.

Figure 3:
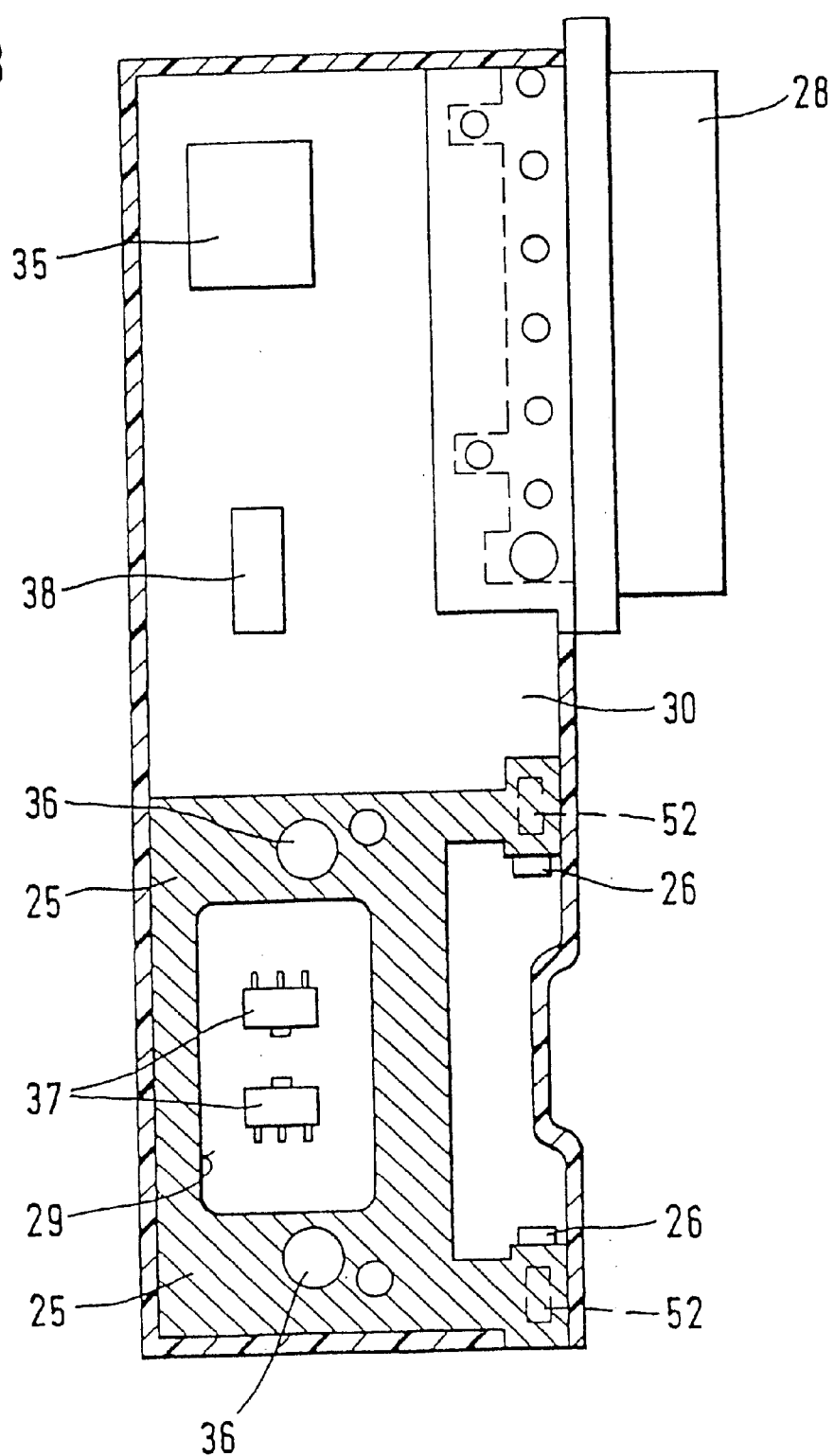
FIG. 3 shows a printed circuit board with a brush holder in accordance with a second exemplary embodiment according to the invention.
Figure 4:
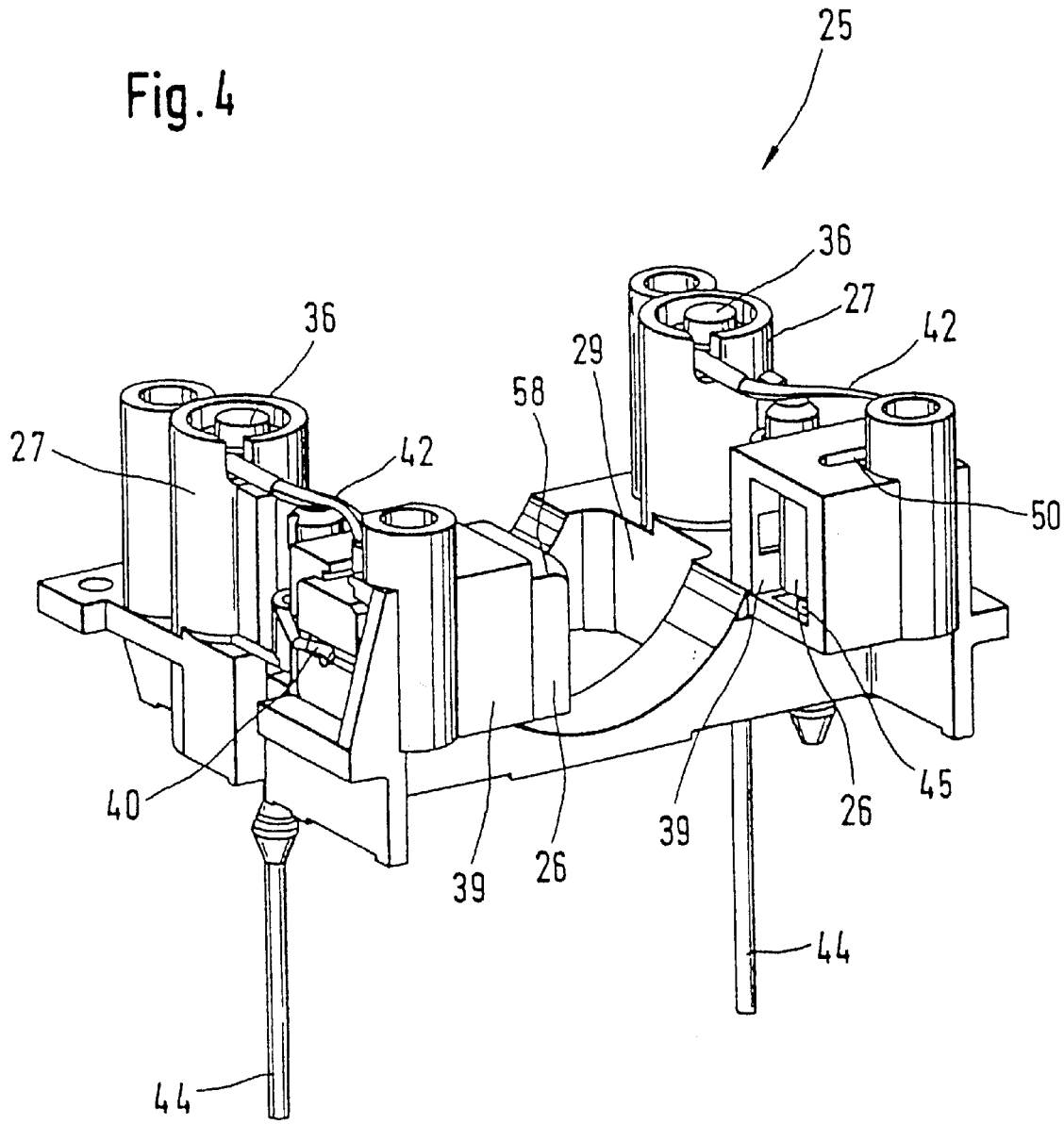
FIG. 4 is a perspective representation of a front view of the brush holder according to FIG. 3.
Figure 5:
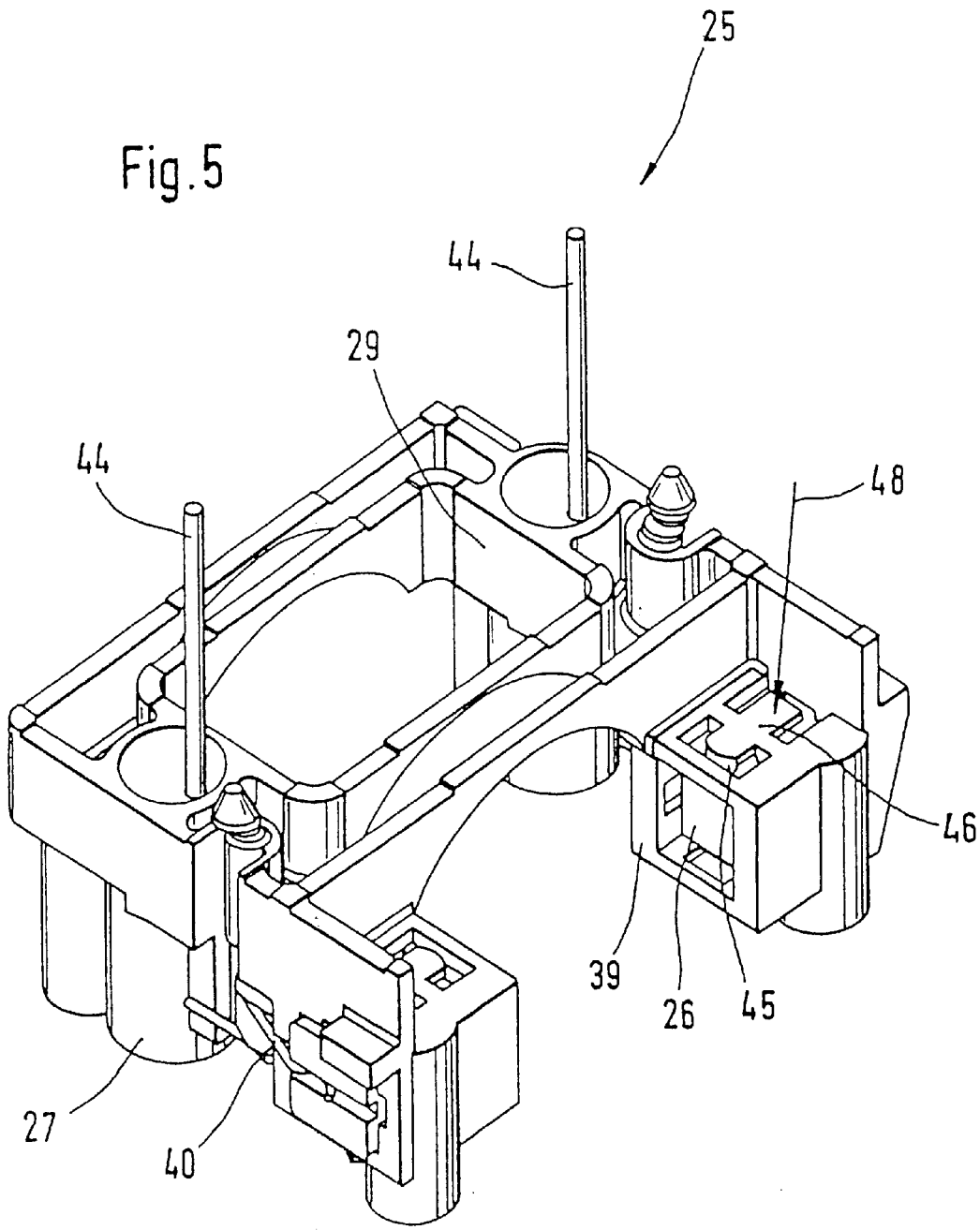
FIG. 5 is a bottom view of the perspective representation of the brush holder according to FIG. 4.

As shown in detail in FIG. 4, a perspective front view of the brush holder 25 from FIG. 3, the two opposing brushes 27 are accommodated in tubular brush holders 39 that are provided. Spring elements 40 produce a corresponding prestressing of the brushes 26 in the tubular brush holders 39 toward the commutator 18. Electric lines 42 lead from the backside of the brushes 26 and produce an electrical connection to the interference suppression chokes 36. The interference suppression chokes 36 have electrical connections 44 protruding from the brush holder 25, which can be introduced into corresponding openings in the printed circuit board 30 in order, by way of contact paths on the printed circuit board 30, which are not shown in detail, to produce a contact with the components 35, 38 and the plug receptacle 28 on the printed circuit board 30. When the brush holder 25 is not yet assembled, the two brushes 26 are secured on their open side of the tubular brush holders 39 by means of detent projections 45, as is the case with the brush 26 that is depicted on the right in FIG. 4 and the two brushes 26 that are depicted in FIG. 5. As shown in detail in FIG. 5, a rear view of a perspective representation of the brush holder 25 from FIG. 4, the detent projections 45 are affixed to corresponding rockers 46 of the tubular brush holders 39 so that with an actuation of the rockers 46, for example in the direction of an arrow 48 drawn in FIG. 5, a corresponding movement of the detent projections 45 away from the brushes 26 and therefore an unlocking of the brushes 46 takes place, which are then moved out of their tubular brush holders 36 by the spring force of the spring elements 40.

The assembly of the drive device 1 takes place by means of the completely equipped printed circuit board 30, which contains the brush holder 25 as well as all of the other components 28, 35, 36, 37, 38. As shown in FIG. 1, the printed circuit board 30 is introduced into the drive device 1, which except for the printed circuit board 30 and the transmission housing cover 32 is otherwise completely assembled, with the brush holder 25 in front, into the recess 23 of the transmission housing 10. The retention of the brush holder 25 in the recess 23 occurs for example by means of a slight press-fitting or elastic prestressing of the brush holder 25 in the recess 23. It is also conceivable to provide grooves, guide faces, centering pins, or the like, not shown in detail, in the recess 23 of the transmission housing 10, which in connection with appropriate, correspondingly embodied detent and/or guide elements on the brush holder 25, produce a retention and furthermore, for example a detent connection of the brush holder 25 in the recess 23. After the assembly of the brush holder 25 with the brushes 26 disposed inside the tubular brush holders 39 and the printed circuit board 30, then the disengaging of the brushes 26 takes place, for example through the actuation of the detent projections 45, whereupon the brushes 26 come to rest against the commutator 18 of the armature 14 without a subsequent adjustment of the brush holder 25 being required.

The disengaging or unlocking of the brushes 26 can take place for example through the introduction of a pin, not shown in detail, into openings 52 indicated in FIG. 3 on the side of the printed circuit board 30 opposite from the brush holder 25, so that the rockers 46 shown in FIG. 5 can be correspondingly actuated in the arrow direction 48. Naturally it is also possible to carry out the unlocking of the brushes 26 by way of the transmission housing cover 32 which for this purpose, has for example two struts 54 shown in FIG. 2, which can correspondingly engage in the openings 52 of the printed circuit board 30. However it is also possible, as shown with dashed lines in FIG. 2, to provide pins 55, shown in FIG. 2, or the like in the recess 23, which can engage in openings 50 of the tubular brush holders 39 shown in FIG. 4, which are provided on the side of the brush holder 25 oriented toward the commutator 18, so that after the complete insertion of the brush holder 25 into the recess 23, an automatic unlocking of the brushes 26 takes place. Instead of the locking and unlocking of the brushes 26 explained above, it is also possible to provide rounded or also beveled surfaces 58 oriented toward the commutator 18 on the brushes 26, as shown by the brush 26 depicted on the left in FIG. 4, in order when radially sliding the brush holder 25 onto the commutator 18, to permit the brushes 26 which protrude from the tubular brush holders 39 to slide back without tilting.

The foregoing relates to a preferred exemplary embodiments of the invention, it being understood that other variants and embodiments thereof are possible within the spirit and scope of the invention, the latter being defined by the appended claims.

What is claimed is:

1. A drive device for moving a sliding sunroof of a vehicle, comprising an electric motor which has an armature with a commutator, said electric motor is accommodated in a poll housing and whose part disposed outside the poll housing constitutes a transmission drive shaft for a transmission that is accommodated in a transmission housing, said transmission housing adjoins the poll housing and contains a printed circuit board that supports a brush holder whose brushes engage the commutator of the armature, the printed circuit board (30) extends with its greatest expanse essentially lateral to the armature shaft (17) of the armature (14) and at least partially covers the commutator (18) of the armature (14) and is spaced radially apart from the commutator, wherein the brush holder (25) engages in a recess (23) in the transmission housing (10) which is provided in a vicinity of the commutator (18), and for assembly, the brush holder (25) is slid in the radial direction over the commutator (18) of the armature (14) that is mounted in the transmission housing (10).

2. The drive device according to claim 1, in which the printed circuit board (30) has a rectangular shape.

3. The drive device according to claim 2, in which the printed circuit board (30) assumes almost a width of the transmission housing (10) and extends essentially the same width as the brush holder (25) with a greatest expanse lateral to the armature shaft (17) of the armature.

4. The drive device according to claim 2, in which the brush holder (25) has a contacting section in the form of a plug receptacle (28), which is part of the brush holder (25).

5. The drive device according to claim 1, in which the printed circuit board (30) assumes almost a width of the transmission housing (10) and extends essentially the same width as the brush holder (25) with a greatest expanse lateral to the armature shaft (17) of the armature.

6. The drive device according to claim 1, in which the brush holder (25) has a contacting section in the form of a plug receptacle (28), which is part of the brush holder (25).

7. The drive device according to claim 1, in which the brush holder (25) has interference suppression chokes (36), which are integrated into the brush holder (25).

8. The drive device according to claim 7, in which the brush holder (25) is comprised of plastic and the interference suppression chokes (36) are integrated into sleeve-shaped recesses (27) in the plastic.

9. The drive device according to claim 1, in which the brush holder (25) has elements (45, 46), which secure the brushes (26) in an assembly position inside provided tubular brush holders (39) for the assembly of the brush holder (25).

10. The drive device according to claim 1, in which in the recess (23) or on a transmission housing cover (32) of the drive device (1), elements (54; 55) are provided which lead to an unlocking of the brushes (26) in the brush holder (25), which brushes are disposed in an assembly position inside tubular brush holders (39).

11. The drive device according to claim 1, in which surfaces (58) of the brushes (26) oriented toward the commutator (18) are embodied as rounded or beveled.

12. The drive device according to claim 1, in which the printed circuit board (30) has at least one Hall sensor (37), which is disposed in a immediate vicinity of a magnet ring (19) provided on the armature (14) after the brush holder (25) is inserted into the recess (23).

* * * * *